US006654795B1

(12) United States Patent
Coile

(10) Patent No.: US 6,654,795 B1
(45) Date of Patent: Nov. 25, 2003

(54) SYSTEM AND METHOD FOR DISTRIBUTION OF NETWORK FILE ACCESSES OVER NETWORK STORAGE DEVICES

(76) Inventor: Brantley W. Coile, 310 Cedar Creek, Athens, GA (US) 30605

( * ) Notice: Subject to any disclaimer, the term of this patent is extended or adjusted under 35 U.S.C. 154(b) by 0 days.

(21) Appl. No.: 09/513,146

(22) Filed: Feb. 25, 2000

(51) Int. Cl.⁷ .............................................. G06F 15/16
(52) U.S. Cl. ..................................................... 709/219
(58) Field of Search ........................ 707/3, 10; 709/203, 709/215, 224, 227, 228, 216–219, 238

(56) References Cited

U.S. PATENT DOCUMENTS

| | | | |
|---|---|---|---|
| 5,583,994 A | | 12/1996 | Rangan |
| 5,592,626 A | * | 1/1997 | Papadimitriou et al. .... 709/102 |
| 5,630,125 A | | 5/1997 | Zellweger |
| 5,712,979 A | | 1/1998 | Graber et al. |
| 5,721,827 A | | 2/1998 | Logan et al. |
| 5,727,159 A | | 3/1998 | Kikinis |
| 5,802,299 A | | 9/1998 | Logan et al. |
| 5,860,068 A | | 1/1999 | Cook |

(List continued on next page.)

FOREIGN PATENT DOCUMENTS

WO    WO 95/21415    8/1995

OTHER PUBLICATIONS

Web pages from http://www.cisco.com, "Local Director", Cisco Systems, Inc., 1999.
Presentation slides "High–Performance I/O Systems: From Architectures to Applications," Choudhary et al. *Tutorial at ISCA '99*.
Masters Thesis entitled "An Evaluation of the Storage Systems Based on Network–Attached Disks", Ma, Aug., 1998.
Masters Thesis entitled "A Client Oriented, IP Level Redirection Mechanism," Gupta, Aug., 1998.
Article entitled "The Magicrouter, an Application of Fast Packet Interposing", *Second Symposium on Operating Systems Design and Implementation*, Anderson et al., May 17, 1996.
RFC entitled "The IP Network Address Translator (NAT)", Egevang et al., RFC 1631 May, 1994.

*Primary Examiner*—Krisna Lim
*Assistant Examiner*—Kimberly Flynn
(74) *Attorney, Agent, or Firm*—Jones Day

(57) ABSTRACT

The present invention is a system and method supporting efficient distribution of file access requests across one or more storage device systems. A typical system according to the present invention includes a gateway system, one or more indexing system and one or more storage device systems. File access requests are initially received by the gateway system. The gateway system forwards a received file access request to a selected indexing system; the gateway system maintains information concerning the connection between the originator of the request and the selected indexing system. The selected indexing system determines the locations at which the requested file is stored among the storage device systems and selects one of these locations. The selected indexing system forwards the file access request to the storage device system indicated by the selected location, which responds by breaking the requested file into data packets and transmitting the data packets to the request originator. When the first of the data packets passes through the gateway, the gateway updates its information concerning the connection by replacing the information regarding the selected indexing system with information regarding the storage device system indicated by the selected location.

19 Claims, 5 Drawing Sheets

U.S. PATENT DOCUMENTS

| | | | |
|---|---|---|---|
| 5,878,219 A | 3/1999 | Vance, Jr. et al. | |
| 5,884,045 A | 3/1999 | Kurihara | |
| 5,894,554 A | 4/1999 | Lowery et al. | |
| 5,918,239 A | 6/1999 | Allen et al. | |
| 5,940,834 A | 8/1999 | Pinard et al. | |
| 5,940,843 A | 8/1999 | Zucknovich et al. | |
| 5,974,412 A * | 10/1999 | Hazlehurst et al. | 707/3 |
| 5,983,227 A | 11/1999 | Nazem et al. | |
| 5,983,270 A | 11/1999 | Abraham et al. | |
| 5,987,493 A | 11/1999 | Rangan et al. | |
| 5,991,756 A | 11/1999 | Wu | |
| 6,006,265 A | 12/1999 | Rangan et al. | |
| 6,029,175 A | 2/2000 | Chow et al. | |
| 6,182,121 B1 * | 1/2001 | Wlaschin | 709/215 |
| 6,189,030 B1 * | 2/2001 | Kirsch et al. | 709/224 |
| 6,216,123 B1 * | 4/2001 | Robertson et al. | 707/3 |
| 6,278,992 B1 * | 8/2001 | Curtis et al. | 707/3 |
| 6,286,045 B1 * | 9/2001 | Griffiths et al. | 709/224 |
| 6,330,606 B1 * | 12/2001 | Logue et al. | 709/226 |
| 6,341,311 B1 * | 1/2002 | Smith et al. | 709/226 |
| 6,421,674 B1 * | 7/2002 | Yoakum et al. | 707/10 |
| 6,466,966 B1 * | 10/2002 | Kirsch et al. | 709/203 |
| 2002/0010783 A1 * | 1/2002 | Primak et al. | 709/228 |

* cited by examiner

SYSTEM AND METHOD FOR DISTRIBUTION OF NETWORK FILE ACCESSES OVER NETWORK STORAGE DEVICES

BACKGROUND OF INVENTION

1. Field of Invention

The invention relates to a system and method for distributing file accesses over a network of storage device systems. More specifically, the invention relates to a network translation and organizational system and method that receives file access requests and selectively distributes such requests to an appropriate connected storage device system.

2. Description of Related Art

Over the past several years, the Internet has experienced explosive growth. A significant portion of this growth relates to the expanded use of the World Wide Web (the Web). The Web is a group of computer on the Internet providing a distributed hypermedia framework for presenting and viewing multimedia documents.

Web pages may contain a variety of multimedia elements and links to other Web pages. Pages are generally constructed using the Hypertext Markup Language (HTML) although other document formatting standards may play a role such as Cascading Style Sheets (CSS) and Extensible Markup Language (XML)—and its progeny such as the Synchronized Multimedia Integration Language (SMIL) and the Resource Description Framework (RDF).

Once a page is created, the page resides on a Web server system, or Web site. A particular Web site may host a variety of pages. Client computers can access pages residing on Web sites using a variety of commonly available browser software packages such as Internet Explorer (Microsoft), Netscape (Netscape) or other similar product.

The browser software and the server system communicate with each other using the Hypertext Transfer Protocol (HTTP). The client issues a request for a particular resource on the Web using a Uniform Resource Identifier (URI); typically in the case of an HTML Web page, the URI will be a Uniform Resource Locator (URL). A URL specifically identifies a particular resource such as a Web page on the Web. The URL will indicate the particular computer on the Web on which the desired Web page resides, as well as the location of the desired Web page on that computer.

A browser software on a client computer generates an HTTP request under a variety of user triggered circumstances such as entering a target URL, selecting a link in a currently viewed page, selecting an item from the browser's history list or pressing the home button. In addition, HTTP requests are generated automatically when other discrete resources are included within a retrieved Web page; for instance, a second HTTP request would be generated for requesting and retrieving an image embedded within page retrieved from an initial user triggered HTTP request.

When the Web server indicates in the URL receives the request, the server parses the location information in the URL. Servers utilize a recursive hierarchical directory structure for storing Web available resources. The parsed location information from the request serves as a map by which the server locates the requested resource. The server formats an HTTP response including the requested resource and forwards the response to the requesting client.

With the tremendous proliferation of Web usage, the volume of requests has overburdened single Web servers. As seen in FIG. 1, which illustrates a known server system 180 that deals with this problem utilizing a load balancing server 120 and a cluster 110 of identical Web servers 114, 118 where each servers stores all Web pages for the site. Dynamic content may be available through database server 130 connected to data repository 140. The load balancing server 120 is connected to a local ethernet 154 controlled via a router 154. The system is connected to the Internet 160 through the ethernet 154 and router 154. End users access the server system 180 through end user computers 170.

This solution has several disadvantages. First, all Web servers must redundantly store all pages for the single logical Web site. Second, the load balancing server must deal with the flow through for all communication between the client and the selected server in the cluster.

The same content management issues also occur within the context of mulitmedia content servers having a set of file servers and a set of network attached storage systems. Even in load balancing systems, communications must repeatedly flow through the file servers rather than directly between the client and the data storage systems.

The prior art systems do not support the efficient distribution of multiple simultaneous file requests to a single logical server. Further, they do not provide for establishment of direct communication paths between clients and data storage systems. Finally, current systems usually require redundant storage of all data on each data storage system. The system according to the present invention addresses these disadvantages.

SUMMARY OF THE INVENTION

The present invention is directed to a system and method for distributing file access requests over connected storage device systems. A system according to the present invention will include one or more storage device systems, one or more indexing systems and a gateway system.

When an incoming file (data set) access request is received at the gateway system, it establishes a connection between the computer originating the file access request and an indexing system and forwards the file access request to the indexing system. The indexing system receives the file access request, locates a storage system that contains the file indicated in the file access request and forwards the file access request to the located storage system. The located storage system receives the request and generates a data packet containing file data directed to the computer originating the file access request. As the data packet passes through the gateway system, the gateway system updates the connection between the request originating computer and the indexing system to a connection between the request originating computer and the located storage system.

The above and other objects and advantages of the present invention will become more readily apparent when reference is made to the following description, taken in conjunction with the accompanying drawings.

DETAILED DESCRIPTION OF THE INVENTION

Figure 1:
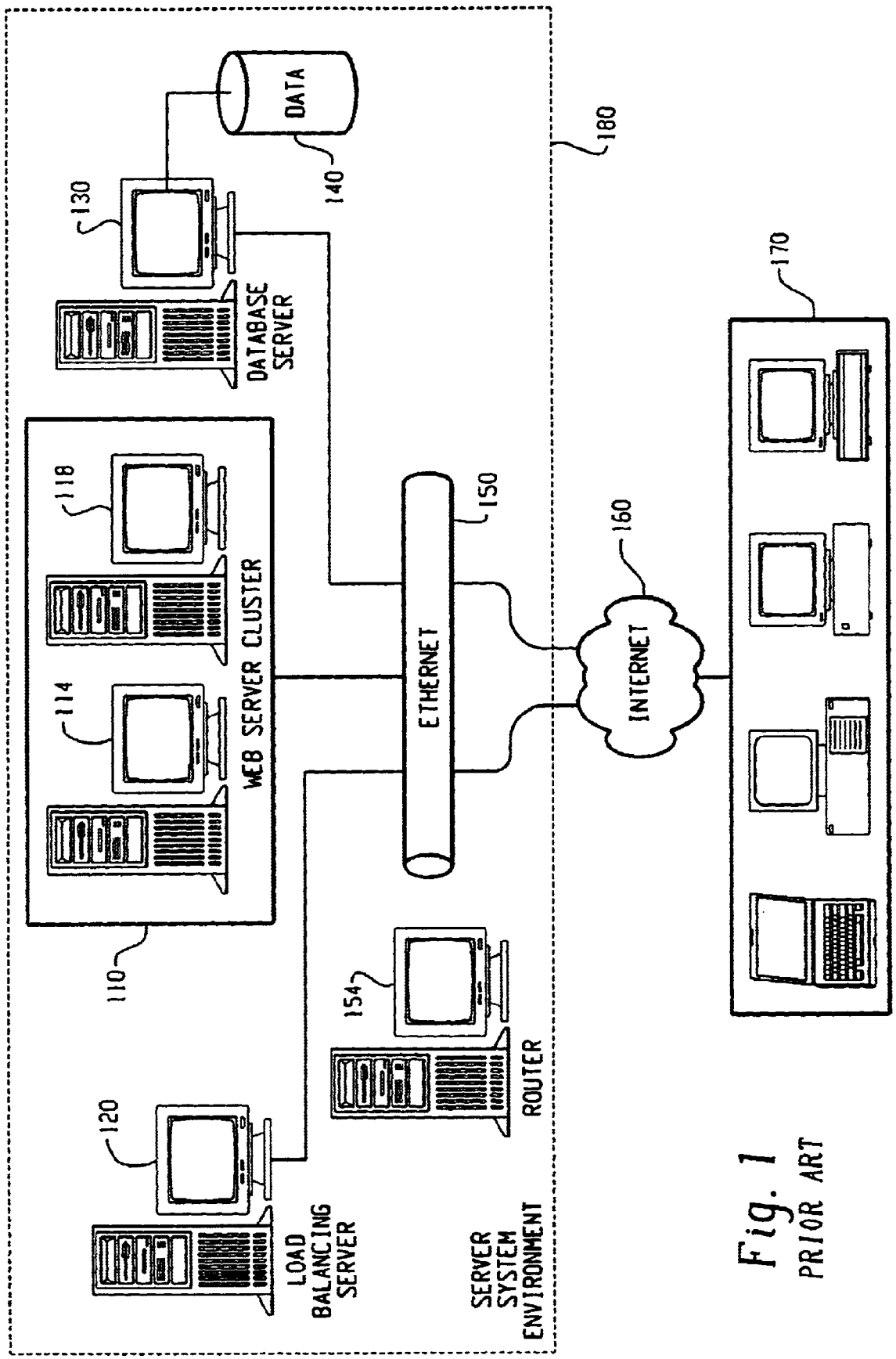
FIG. 1 displays a typical prior art system utilizing a cluster of identically configured Web servers.

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

Figure 2:
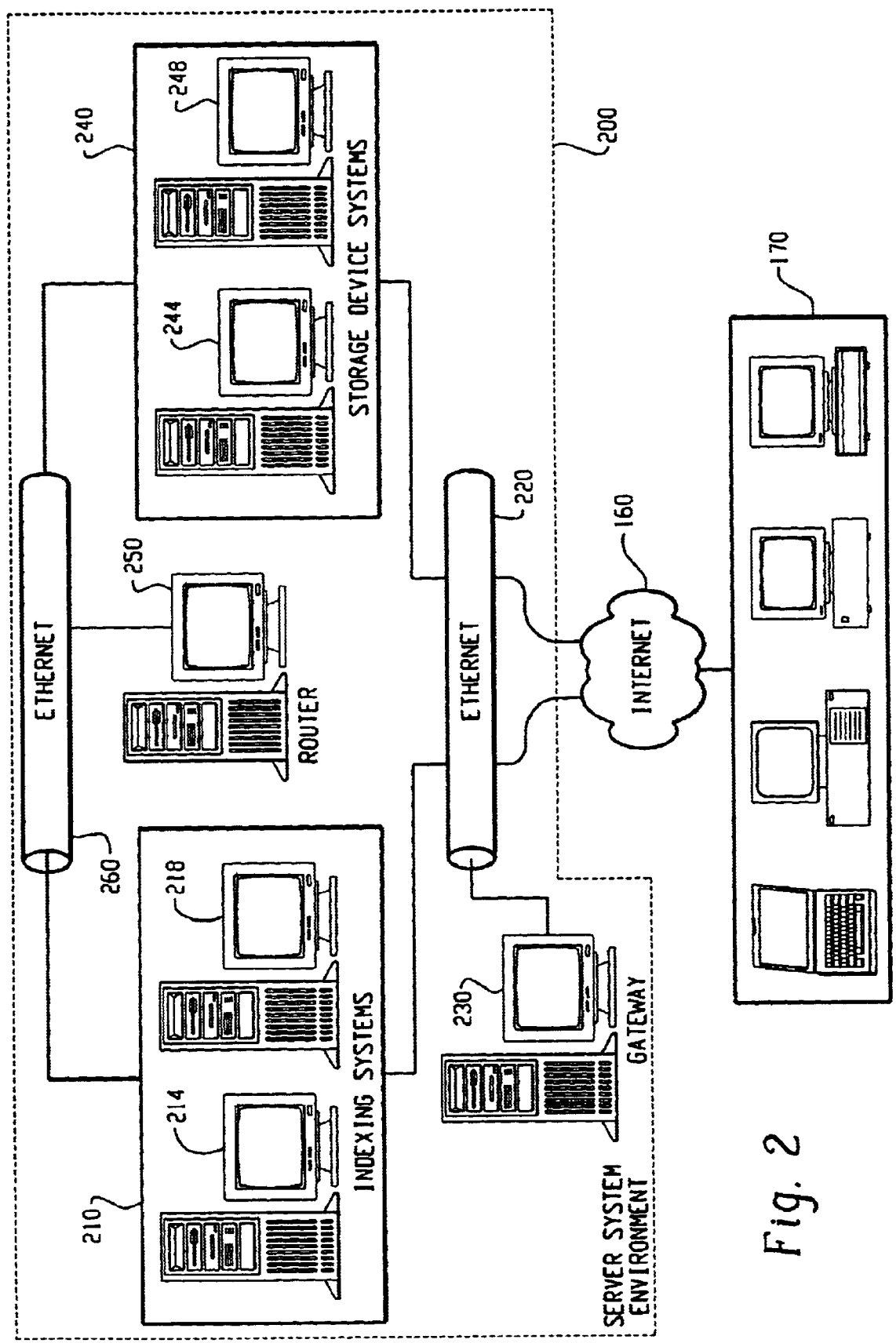
FIG. 2 represents a typical environment embodying the present invention.

In a preferred embodiment, the present invention includes a gateway system, one or more storage device systems and one or more indexing systems. A typical environment is displayed in FIG. 2. End users access the system 200 through client computers 170 connected to a network such as the Internet 160.

A gateway system 230 provides access between the Internet 160 and the internal server system environment ethernet 220, or a similar network architecture. The gateway system 230 may also serve as a router for the ethernet 220. A "router" is a piece of hardware which operates at the network layer to direct packets between various nodes of one or more networks. A separate router system may also be used. The network layer generally allows pairs of entities in a network to communicate with each other by finding a path through a series of connected nodes. In a preferred embodiment, the gateway system may be of the type described in U.S. Pat. No. 5,793,763 entitled SECURITY SYSTEM FOR NETWORK ADDRESS TRANSLATION SYSTEMS issued Aug. 11, 1998, which is expressly incorporated herein by reference in its entirety. Such a system may serve as the gateway system component of the present invention modified as described below to update connection slots associated with file requesters upon receipt of a data packet destined for the requestor.

The system includes an indexing subsystem 210 containing one or more indexing systems (e.g., 214, 218). All indexing systems 214, 218 are connected to the ethernet 220. The system also includes a storage subsystem 240 containing one or more storage device systems (e.g., 244, 248) connected to the ethernet 220. Each storage device system contains one or more files stored in a storage device such as a hard disk drive or a removable media drive such as a CD-ROM drive or a CD-ROM jukebox loaded with appropriate removable media. To improve efficiency, each storage device system may include one or more levels of caches. In a preferred environment, the storage device systems are network connected disk systems.

The union of all files stored within the storage subsystem constitutes a single information space for the server environment 200. Each indexing system in the indexing subsystem 210 contains an index correlating a file identifier with one or more locations of the file corresponding to that file identifier. Each location will indicate both a storage device system and a location on that storage device system. A particular file may be stored one or more times on one or more storage device systems.

The gateway system, all indexing systems and all storage device systems communicate via ethernet 220. The ethernet 220 may be constructed through a single physical network. In a preferred embodiment, the indexing systems 214, 218 and the storage device systems 244, 248 are also connected to each other via a private ethernet 260 managed by router 250. Private communications among the various indexing systems and storage device systems may occur via this ethernet 260.

The gateway system 230 typically includes a storage device capable of storing one or more connection objects. Each connection object represents a connection between a client computer and a specific indexing or storage device system.

User software running a client computer 170 generates a file access request targeted at the server system environment 200. In a typical situation where the present invention is embodied in a Web server system, the client computer 170 is running Web browser software, and the user has activated a link, a history item or entered a target URL. The URL indicates a network address corresponding to the server system environment 200. The access request travels via the Internet 160 to the server system environment 200 where it is received by the gateway system 200.

Figure 3:
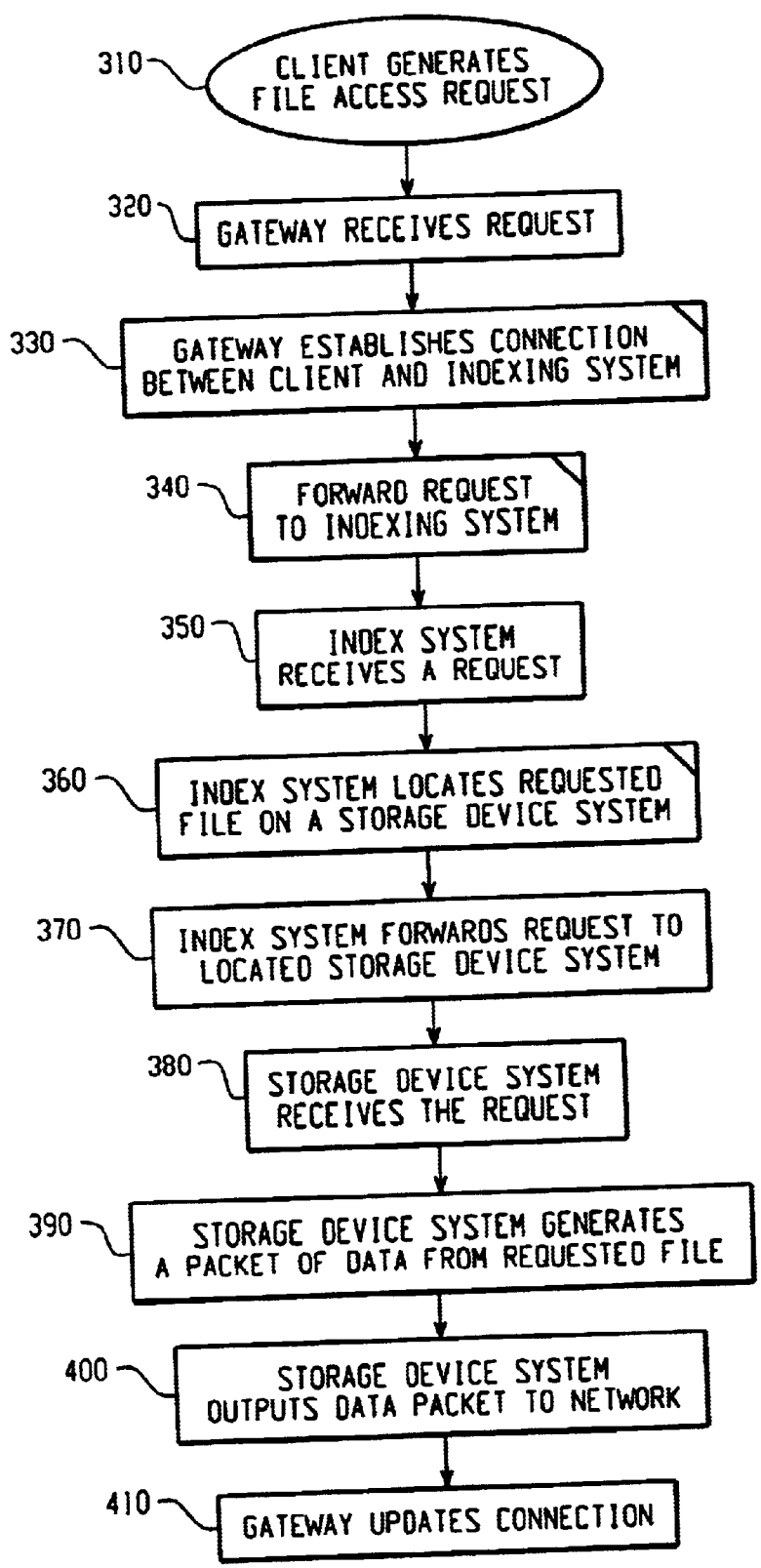
FIG. 3 is a process diagram tracking the receipt and service of a file access request.

The various system components process the received file access request as seen in FIG. 3. An end user with an originating client computer 170 generates a file access request targeted at or through the gateway system 230 (step 310). The file access request will include a file identifier. In a Web server embodiment, the file identifier will include a URL. The file access request will also provide addressing information identifying the origin of the file access request and its destination. The file access request is received via the Internet 160 by the gateway system 230 (step 320).

Figure 4:
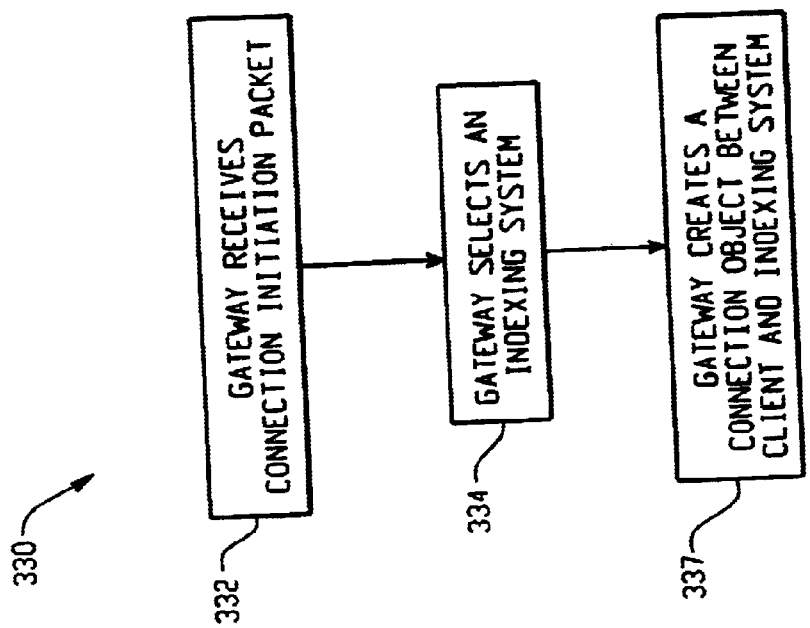
FIG. 4 is a process diagram displaying the establishment of a connection between a client and an indexing system.

The gateway system 230 establishes a connection between the originating client computer 170 and a selected indexing system (e.g., 214) (step 330). FIG. 4 graphically depicts the process by which the gateway establishes this connection in step 330. The gateway 230 receives a connection initiation packet from the client computer 170 (step 332). A "packet" is a collection of data and control information including source and destination node addresses and source and destination ports. The gateway 230 selects an indexing system among those available in the indexing subsystem 210 (step 334).

The selection process may be random, based on system load of available indexing systems or, in a preferred embodiment, based on a circular queue of indexing system. In the circular queue approach, all indexing systems are part of the queue. When an incoming file access request is received, the indexing system at the head of the queue is selected, and the head of the queue is advanced to the next position in the queue. Since the queue is circular, indexing systems will be selected on a least recently selected basis. A variety of methods for implementing circular queues such as linked-list or static array are known to those skilled in the art, and any such method could be used in implementing this selection process (see, e.g., W. Ford and W. Topp, *Data Structures with C++*, Prentice Hall, Inc., 1996, pp. 204–214).

Figure 5:
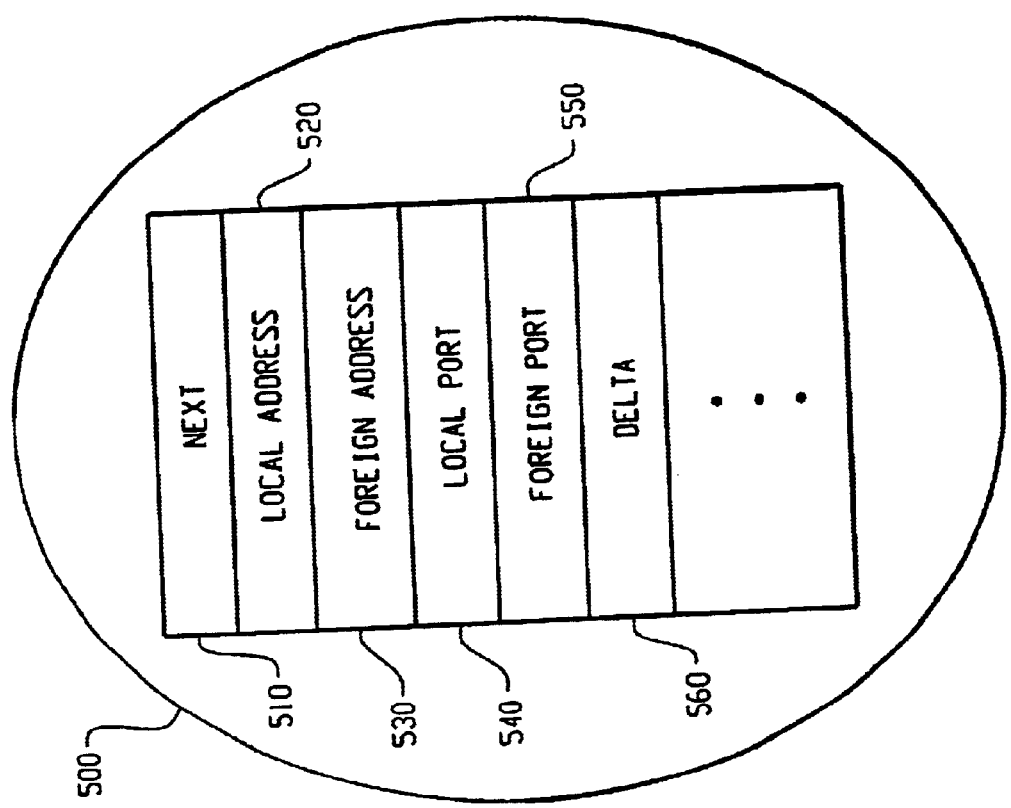
FIG. 5 is a graphical representation of a connection object.

Once the indexing system is selected, the gateway system 230 creates a connection object representing the connection between the client computer 170 and the selected indexing system (e.g., 218) (step 337). As seen in FIG. 5, a typical connection object 500 may include a variety of data fields. A next field 510 could be used where connection objects are stored by the gateway in a list structure. Connection objects will also track the origin and destination of the connection in terms of foreign IP address 530 and port 550 and local IP address 520 and port 540. A delta field 560 may be used to hold a statically calculated value used to modify checksums in packets translated by the gateway system 230 as more fully described below. The gateway may store one or more such connection objects representing connections between clients 170 and hosts within the server environment 200. These connection objects may be organized in a variety of ways including a linked-list, a static array, a dynamic array or other storage structure known to those skilled in the art.

In this embodiment, all file requests are assumed to be directed to a single virtual server having a single logical IP address and port. Where the server environment 200 includes multiple virtual servers, multiple sets of connection objects may be used by the gateway to differentiate file access requests directed at the distinct virtual servers. In such an instance, the gateway will use the destination address and port of the received file access request to determine which set of connection objects to utilize. Use of a gateway as described in aforementioned U.S. Pat. No. 5,793,763 would also be possible where each translation slot would correspond to a single virtual server and the connection objects stored with the translation slot would correspond to particular file requests made of that virtual server. The various virtual servers may each have its own indexing and/or storage subsystem, may share common indexing and/or storage subsystem or may mix shared and private indexing or storage systems. In a preferred embodiment, each file access request triggers the creation of a new connection object corresponding to the foreign host and foreign port designated in the request.

Figure 6:
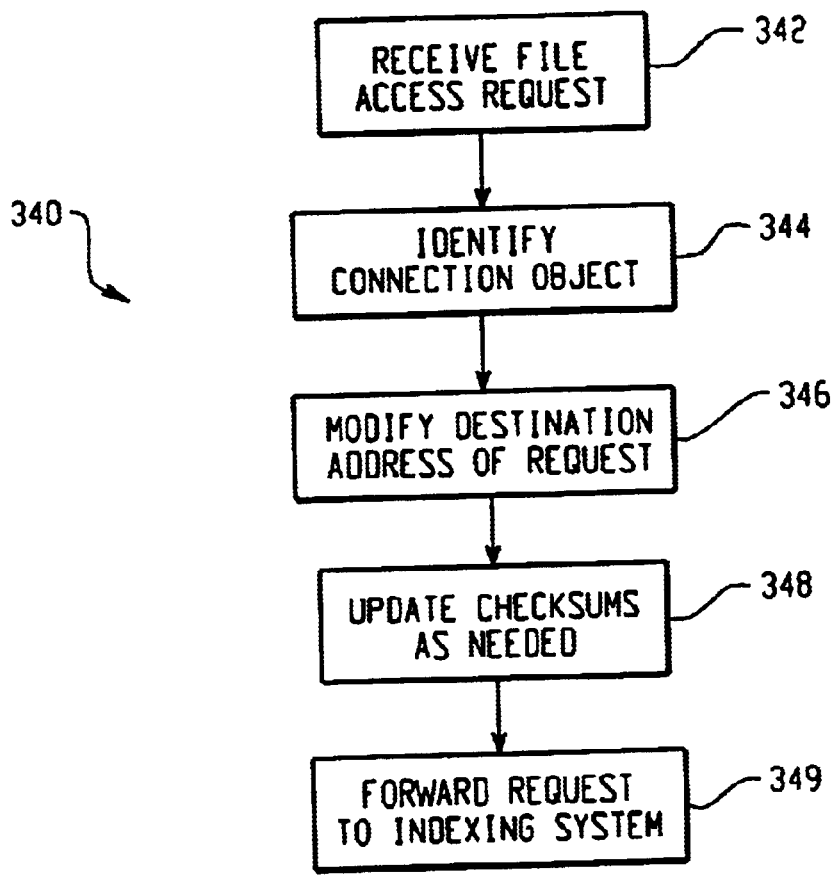
FIG. 6 is a process diagram displaying the forwarding of file access requests by the gateway system to an indexing system.

After establishing the connection to the selected indexing system 214, the gateway 230 forwards the received file access request to the selected indexing system 214 via the environment ethernet 220. FIG. 6 depicts the forwarding process in a preferred embodiment. In step 342, the gateway 230 receives the file access request. The gateway 230 locates the connection object created between the client computer originating the file access request and the selected indexing system 214 (step 344). The client computer's address and port uniquely identify each connection object. The appropriate connection object is found by comparing the client computer's address and port as designated in the file access request to the foreign address 530 and port 550 fields of the connection objects stored by the gateway system. A variety of searching schemes may be used to locate the correct connection object. A hashing algorithm based upon the client computer's address and port as designated in the file access is one example. Other organizations and searching methods will be known to those skilled in the art. The gateway forwards the selected indexing system (step 349). Prior to forwarding, the gateway, in a preferred embodiment, performs an address translation on the destination address encoded in the file access request (step 346). If modification of the address requires, checksums encoded in the request may also me modified prior to transmission. General methods of performing address translation are well known in the art as described in aforementioned U.S. Pat. No. 5,793,763 and K. Egevang and P. Francis, "The IP Network Address Translator (NAT)," Request For Comments (RFC) 1631, May 1994 (available at http://www.ietf.org/rfc/rfc1631.txt), which is expressly incorporated herein in its entirety. The checksum offset for a particular translation can be saved in an appropriate field 560 in the connection object 500.

In a further embodiment where the gateway system 230, the systems of the indexing subsystem 210, and the systems of the storage subsystem 240 are on a single physical network, the necessity of checksum modification and/or destination address modification may be eliminated. The connection object may provide forwarding based on a hardware ethernet address of the selected indexing system.

Figure 7:
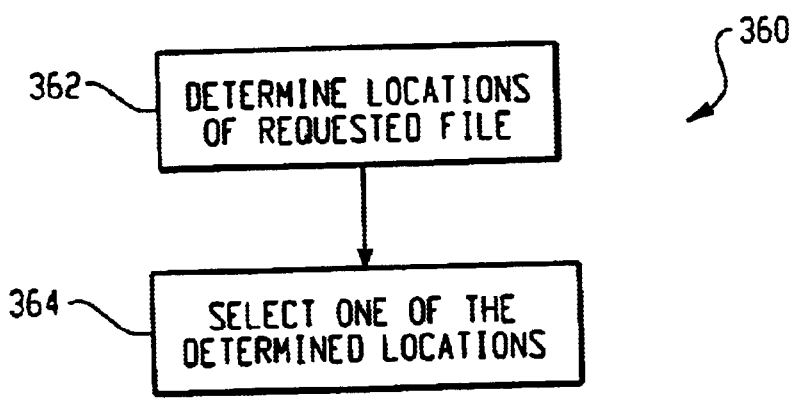
FIG. 7 is a process diagram displaying the determination of a location for the file identified by a file access request.

Upon receipt of the file access request forwarded by the gateway system 230 (step 350), the selected indexing system 214 locates the file identified by the file access request (step 360). FIG. 7 depicts a file location process. An initial determination is made as to the locations of the requested file (step 362). The search process will depend upon the storage structure of the records correlating file identifiers and locations. As will be known to those skilled in the art, a variety of organizational structures and search mechanisms could be used in the present invention. For instance, in a SQL database environment, a query could be initiated utilizing the file identifier as the key. Most current server systems use a hierarchical traversal.

In a preferred embodiment, the search on the indexing systems is accomplished via a hashing scheme. Hashing is a general search technique known to those skilled in the art (see, e.g., Ford, id., pp. 799–814). This technique, however, has not been applied in the context of determination of file locations in a distributed information space.

The hashing scheme in this preferred embodiment may utilize any standard hashing function. The input to the hashing function would be the string representing the file identifier contained in the file access request. In the case of a URL, this identifier information would be the full path of the desired resource on the target server. The result of applying the hashing function to the file identifier would yield an integer value. The integer value would be used as an index into an array buckets where each bucket contained one or more records correlating file identifiers with file locations. The records in the bucket would be searched to locate the record corresponding to the hashed file identifier. In a preferred embodiment, each bucket would constitute a linked-list of records correlating file identifiers with file locations and locating the particular record would be accomplished by linear traversal of the linked list. In other embodiments, the buckets could store the records in an ordered tree structure for more efficient searching using a depth-first technique. In yet other embodiments, the buckets could be organized as a second level hash table utilizing a different hashing function. In this embodiment, the integer resulting from applying the hashing function would again serve as an index into an array of buckets containing records of the type described above. The organization of these buckets could utilize any appropriate structure such as those previously described with respect to the first level hashing table. It will be understood by those skilled in the art that other organization structures for the top level or lower level buckets may be interchangeably utilized within the scope of the present invention.

In a further embodiment, the hashing scheme might include one or more layers of hashing where each layer utilizes the same or differing hash functions. In this embodiment, the hashing function or functions may be applied to various substrings within the file identifier. For example, each level of hashing could be performed with respect to a set of a predetermined number of characters. If six characters were selected as the predetermined number, the first six characters of the identifier would be used for the first level of hashing, the next six would be used for the second level, and so forth. In another embodiment, where the file identifier includes a string based path specification with individual directories in the path indicated by particular delimiters, two level of hashing might be performed. The first level hashing would be applied to the entirety of the identifier except the portion after the final path delimiter. The second level hashing would be applied to the portion of the identifier after the final path delimiter. For example, if http://www.somesite.com/dir/subdir/subsubdir/file.htm were the file identifier, the first level hashing would be applied to the /dir/subdir/subsubdir/ portion of the identifier, and the second level hashing would be applied to the file.htm portion of the identifier. As with the buckets described above, a variety of organizational structures for the buckets could be used interchangeably within the scope of the present invention.

Once the locations of the requested file are determined, a particular location is selected (step 364). This location could be selected in a variety of ways. One of the locations could be selected randomly. The first location in the determined set could be selected; this method may be of particular use if locations are known to be returned by step 362 according to response efficiency of particular locations. In a preferred embodiment, the storage device systems associated with the determined locations are evaluated to determine current usage level of each such system. The location corresponding to the storage device system 244 with the lowest current usage level is selected.

Once a location for the file has been determined, the access request is forwarded to the storage device system 244 indicated by the determined location (step 370). In a preferred embodiment, this transmission will occur using a private ethernet 260. Use of such a private network will reduce traffic on the server environment ethernet 220 and, thereby, may improve efficiency of the overall environment. In such an environment, the indexing system might forward the file access request using a connection redirection protocol (CRP). In one embodiment, the CRP uses a simple send/ACK sequence to send a control message to the located storage device system. The data in the CRP request packet in this embodiment would contain: the foreign IP address, the local IP address, the foreign port number, the local port number and an identifier associated with the requested file. The identifier might be a unique designation associated with the requested file, or preferably a volume/data set name of the requested file on the located storage device system.

The sequence could occur in accordance with the sequencing described in Information Science Institute, "The Transmission Control Protocol," John Postel, ed., Request For Comments (RFC) 793, September 1981 (available at http://www.ietf.org/rfc/rfc0793.txt), which is expressly incorporated herein in its entirety. The maintenance of the transmission control block for handling the transmissions would include variable SND.UNA, SND.NXT, SND.WND, SND.UP, SND.WL1, SND.WL2, ISS, RCV.NXT, RCV.WND, RCV.UP, IRS as described therein.

In a preferred embodiment, each indexing system will also track usage of each file in the information space by monitoring all file access requests forwarded by itself and other indexing system. Each indexing system would monitor the forwarded file accesses issued by all indexing system over the private ethernet 260 in embodiment utilizing such an ethernet, or environment ethernet 220. Each indexing system would maintain a table indicating the usage of each file in the information space. This table will be updated based upon the monitoring the forwarded file access requests.

The usage information in the table may be absolute number of requests, a request rate, or other suitable measure as would be known to those skilled in the art. If the usage information is a request rate, the request rate may be based upon a either a fixed time interval such as a specified number of days, an absolute time frame such as the time since the gateway system was last restarted or a relative time frame such as the time since the particular file was first placed in its first location among the storage device systems.

In a preferred embodiment, indexing systems would run the private ethernet 260 in promiscuous mode; consequently, they would see all traffic communicated over this network. As this network would only include control messages rather than actual data, running the network in promiscuous mode would not create a performance issue.

The control messages occurring on such a network would include:
1. Connection redirection requests (as described above);
2. Copy requests—issued by an indexing system directing a storage device system to copy a data set (file) to a second storage device system;
3. Delete requests—issued by an indexing system directing a storage device system to delete a data set (file); and
4. Move requests—issued by an indexing system directing a storage device system to move a data set (file) from itself to a second storage device system.

When an indexing system determines that a particular data set (file) is in high demand, a copy request may issue to spread the usage across additional storage device system. Once one indexing system issues such a copy request, other indexing systems monitor the request and refrain from making a similar request unless warranted by further usage demands. Upon completion of the copy, all indexing systems update the set of locations associated with the file subject to the copy request.

When an indexing system determines that a particular data set (file) is not being accessed often enough to justify the number of times that it is stored across the storage device systems, the indexing system may issue a delete request to one of the storage device systems containing the particular data set. Once one indexing system issues such a delete request, other indexing systems monitor the request and refrain from making a similar request unless the single requested deletion does not sufficiently correct the situation. Upon completion of the deletion, all indexing systems update the set of locations associated with the file subject to the delete request.

When an indexing system determines that a particular storage device system is being selected significantly more than others, the indexing system may issue a move request with respect to particular data sets stored. This request would issue in response to a load imbalance among storage device systems. Particular data sets may be targeted for moves to other storage device systems to more evenly balance the dynamic load across the storage device system. A move is the functional equivalent of a copy and an implicit delete.

The selected storage device system 244 receives the forwarded file access request (step 380). The storage device system 244 breaks the request file into data packets (step 390) and begins to output the data packets to the ethernet 220 (step 400). The outputted data packets pass through the gateway system 230. The gateway system 230 seeing the destination of the data packets updates the connection object associated with that destination by replacing the address of the selected indexing system with the address of the storage device system emitting the data packets (step 410).

The embodiments described above are given as illustrative examples only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. A system for distribution of network file accesses over storage devices, comprising:
    (a) one or more storage device systems containing files, wherein each storage device system is capable of performing the steps of:
        (i) receiving a file access request;
        (ii) responsive to the receipt of the file access request, generating a file data packet; and
        (iii) outputting the generated file data packet; and
    (b) one or more indexing systems, wherein each indexing system is capable of performing the steps of:
        (i) receiving a file access request comprising a file identifier;
        (ii) locating a storage device system containing a file corresponding to the file identifier in the received file access request; and
        (iii) forwarding the received file access request to the located storage device system; and
    (c) a gateway system for performing the steps of:
        (i) establishing a connection between a client computer and a selected indexing system;
        (ii) forwarding a file access request received from the client computer to the selected indexing system; and
        (iii) upon receiving the generated file data packet from a selected storage device system, changing the connection between the client computer and the selected indexing system to a connection between the client computer and the located storage device system.

2. The system of claim 1, and further comprising a communication network connecting the one or more storage device systems, the gateway system and the one or more indexing systems.

3. The system of claim 1, wherein the gateway system, the one or more indexing systems and the one or more storage devices are connected on a single physical network.

4. The system of claim 1, and further comprising a private communication network connecting the one or more storage device systems and the one or more indexing systems.

5. The system of claim 4, wherein the selected indexing system performs the step of forwarding the file access request to the located storage device system via the private communication network.

6. The system of claim 1, wherein the gateway system comprises a storage device capable of storing one or more connection objects each representing a connection between a client computer and a specific indexing system or a specific storage device.

7. The system of claim 6, wherein the gateway system establishes the connection between the client computer and a selected indexing system by performing the steps of:
    (A) receiving a connection initiation packet from the client computer;
    (B) selecting an indexing system from the one or more indexing systems; and
    (C) creating a connection object representing the connection between the client computer and the selected indexing system in the gateway system's storage device.

8. The system of claim 7, wherein the gateway system performs the step of selecting an indexing system by performing the step comprising of selecting an indexing system based upon current usage of the one or more indexing systems.

9. The system of claim 7, wherein the gateway system performs the step of selecting an indexing system by performing the step comprising of selecting an indexing system based upon a circular queuing algorithm.

10. The system of claim 6, wherein the gateway system forwards a file access request received from the client computer to the selected indexing system by performing the steps of:
    (A) receiving from the client computer a file access request comprising a destination address and a source address;
    (B) identifying the connection object in the gateway system's storage device corresponding to the received the file access request; and
    (C) transmitting the received file access request to the selected indexing system indicated by the identified connection object.

11. The system of claim 10, wherein the gateway system forwards a file access request received from the client computer to the selected indexing system by performing the further step comprising of:
    (D) modifying the destination address of the received file access request to a destination address of the selected indexing system.

12. The system of claim 11, wherein the gateway system forwards a file access request further comprising a checksum received from the client computer to the selected indexing system by performing the further step comprising of:
    (E) updating the checksum of the received file access request to conform with the modified destination address.

13. The system of claim 1, wherein each indexing system locates a storage device system containing a file corresponding to the file identifier in the received file access request by performing the steps of:
    (A) determining a set of storage device systems from the one or more storage device systems containing a file corresponding to the file identifier in the received file access request; and
    (B) selecting a storage device system from the determined set.

14. The system of claim 13, wherein the indexing system performs the step of selecting a storage device system by performing the step comprising of selecting a storage device system from the determined set based upon current usage of the storage device systems in the determined set.

15. A method operable by a gateway system for distribution of a network file access received from a client computer to a storage device system via an indexing system, comprising the steps of:
    (a) establishing a connection between the client computer and the indexing system;
    (b) forwarding a file access request comprising a file identifier received from the client computer to the indexing system;
    (c) upon receiving a file data packet from a storage device system, changing the connection between the client computer and the indexing system to a connection between the client computer and the storage device system.

16. The method of claim 15, and further comprising the steps of (d) receiving by the indexing system the file access request; (e) locating a storage device system containing a file conesponding to the file identifier in the received file access request; and (f) forwarding the received file access request to the icoated storage device system.

17. The method of claim 16, and further comprising the step of (g) receiving a file access request by the located storage device system; (h) responsive to the receipt of the file access request, generating a file data packet by the located storage device system; and (i) outputting by the located storage device system the generated file data packet.

18. The method of claim 15, and further comprising the steps of (d) receiving a file access request by a storage device system; (e) responsive to the receipt of the file access request, generating a file data packet by the storage device system; and (f) outputting by the storage device system the generated file data packet.

19. A computer-readable, digital storage device containing instructions, that upon executiot by a processor in a gateway system, cause the processor to distribute a network file access received from a client computer to a storage device system via an indexing system, by performing the steps comprising of:

(a) establishing a connection between the client computer and the indexing system;

(b) forwarding a file access request comprising a file identifier received from the client computer to the indexing system;

(c) upon receiving a file data packet from a storage device system, changing the connection between the client computer and the indexing system to a connection between the client computer and the storage device system.

* * * * *

UNITED STATES PATENT AND TRADEMARK OFFICE
CERTIFICATE OF CORRECTION

| | | |
|---|---|---|
| PATENT NO. | : 6,654,795 B1 | Page 1 of 1 |
| APPLICATION NO. | : 09/513146 | |
| DATED | : November 25, 2003 | |
| INVENTOR(S) | : Brantley W. Coile | |

It is certified that error appears in the above-identified patent and that said Letters Patent is hereby corrected as shown below:

In col. 10, line 17, cancel the term "the".

In col. 11, line 4, the term "lcoated" should read --located--.

Signed and Sealed this

First Day of May, 2007

JON W. DUDAS
*Director of the United States Patent and Trademark Office*